3,709,876
WATER SOLUBLE HYDROXYETHYL METHYL CELLULOSE ETHER THICKENER FOR LATEX PAINT
Ronald L. Glomski, Lewis E. Davis, and Joseph A. Grover, Midland, Mich., assignors to The Dow Chemical Company, Midland, Mich.
Continuation-in-part of application Ser. No. 138,435, Apr. 29, 1971. This application Apr. 10, 1972, Ser. No. 242,477
Int. Cl. C08b *11/08, 21/32*
U.S. Cl. 260—231 A          10 Claims

ABSTRACT OF THE DISCLOSURE

New water-soluble hydroxyethyl methyl cellulose ethers have been prepared which are improved thickeners for latex paint. These new ethers have a thermal gel point greater than 100° C., a hydroxyethyl MS of about 1.0–3.5, a methoxy DS of about 0.6–1.6 and a total DS of about 1.4–2.4. Latex paint thickened with these new ethers has improved enzyme resistance and compatibility with pre-dispersed colorants.

BACKGROUND

This application is a continuation-in-part of Ser. No. 138,435 filed Apr. 29, 1971, now abandoned.

Water-soluble cellulose ethers have long been employed in aqueous coating compositions as thickeners and protective colloids. Hydroxyethyl cellulose products provide good flow and brush out with complete color development but have low resistance to bacterial degradation. For example, Lindenfors (Acta Chemica Scand., 16, 1111 (1962)) reports under controlled enzymatic hydrolysis conditions, a residual viscosity of 1.7% for hydroxyethyl cellulose with a molar substitution (MS) of 1.50 compared with 3.8% for a methylhydroxyethyl cellulose (DS 1.66), 7.3% for methyl cellulose (DS 1.83) and 13.2% for a methylhydroxypropyl cellulose (DS 1.9).

Rodgers, Wakeman, and Savage, U.S. Pat. 3,388,082 describes methyl cellulose ethers with a high hydroxypropyl substitution which are suitable thickeners with increased enzymatic resistance. Yet with certain pigments, good color development and compatibility cannot be achieved with these hydroxypropyl ethers. By good color development is meant the ability of a coating composition to retain a pigment dispersion without significant loss of pigment effectiveness through agglomeration of flocculation. It is visually evident in the color uniformity of a coating applied with varying amount of shear.

By combining hydroxyethyl and methyl substitution in a new and carefully controlled manner, novel hydroxyethyl methyl cellulose ethers have been prepared which have the complete color development characteristics of a hydroxyethyl cellulose plus the superior enzyme resistance of a methyl cellulose, a combination highly desired for use as a latex paint thickener.

STATEMENT OF THE INVENTION

The improved cellulose ether latex paint thickeners are water-soluble hydroxyethyl methyl cellulose ethers having a thermal gel point greater than about 100° C., a hydroxyethyl molar substitution of about 1.0–3.5, a methoxyl degree of substitution of about 0.6–1.6, and a total degree of substitution of about 1.4–2.4 as further defined by the accompanying figure. To achieve the total degree of substitution of about 1.4–2.4 requires a carefully controlled etherification of alkali cellulose with methyl chloride and ethylene oxide. Preferably alkali cellulose, prepared by blending about 1.2–3.0 moles NaOH per mole cellulose, is reacted with about 1.6–6.0 moles methyl chloride and about 3.4–6.8 moles ethylene oxide at about 40°–60° C. The new hydroxyethyl methyl cellulose products have a high resistance to enzymatic degradation and provide good color development and compatibility when used as a latex paint thickener.

GENERAL DESCRIPTION

The new hydroxyethyl methyl cellulose ethers disclosed herein are ethers with a thermal gel point greater than about 100° C. and falling within the general limits defined by the Points A–J of the appended drawing. These limits encompass cellulose ethers with a hydroxyethyl molar substitution (MS) of 1.0–3.5, a methoxyl degree of substitution (DS) of 0.6–1.6, and a total degree of substitution (TDS) of 1.4–2.4.

The terms "molar substitution" (MS) and "degree of substitution" (DS) are conventional terms describing substitution on the anhydroglucose units of the cellulose chain. The term "total degree of substitution" (TDS) referers similarly to the average total number of cellulosic hydroxyl groups that are substituted per anhydroglucose unit. The total degree of substitution will be less than the sum of the hydroxyethyl MS and methoxyl DS because of formation of side chain glycol ethers.

In general, a high hydroxyethyl MS favors color compatibility, a lower methoxyl DS gives a higher gel point, and a high total DS provides improved enzyme resistance. The maximum possible total DS is 3.0. However, as indicated by Lindenfors (op. cit.), theoretically cellulose derivatives are not susceptible to microbiological attack if there is at least one firmly bound substituent in every anhydroglucose. However, the fact that products with DS values over one are degraded enzymatically is indicative of the non-uniform substitution of the products. Also a higher total DS is required for a product prepared from cotton linters than from a less crystalline wood cellulose.

Enzymes are chemicals secreted by fungi, bacteria and other microorganisms which split natural products into simple molecules which the microorganisms absorb for nourishment. Even in a sterile medium, enzymes can attack cellulose at points adjacent to unsubstituted anhydroglucose units to form sugars. However, etherification greatly increases the resistance of the etherified unit to enzymatic attack.

The new ethers are prepared by reacting methyl chloride and ethylene oxide with alkali cellulose at about 40°–60° C. The alkali cellulose is prepared by treating cellulose with about 1.2–3.0 moles of 35–70% aqueous NaOH per mole cellulose at about room temperature. A dip tank as described in Savage U.S. Pat. 2,949,452, a spray mixer as described by Erickson U.S. Pat. 2,469,764, or a slurry reactor as described by Haskins, e.g., U.S. Pat. 2,131,733 are suitable. Contact with air is minimized to reduce viscosity loss.

Etherification is carried out in a pressure reactor in the absence of air at about 40–60° C. Because of the greater reactivity of the ethylene oxide, the reactor is generally charged with the major proportion of the methyl chloride at room temperature, heated to about 40°–50° C., and then the ethylene oxide added at a rate to maintain the desired temperature. However, incremental additions of methyl chloride and ethylene oxide can also be used. Normally, a total of about 1.0–6.0 moles of methyl chloride and about 3.4–7.0 moles of ethylene oxide are charged per mole of cellulose.

Careful control of the exothermic etherification is necessary to minimize irregular and uneven substitution. To maintain a temperature of about 40°–60° C., external cooling means are employed. Excess methyl chloride can be used as a heat transfer and ebullient cooling agent. Other ebullient diluents such as dimethyl ether or a water-soluble organic liquid such as isopropanol or tertiary butanol can also be used to provide more effective heat transfer and moderate the rate of etherification.

When the exothermic hydroxyethylation is completed, the reaction can be finished at 55–80° C. without harm. The overall reaction time may be 4–12 hours. Then the reactor is vented, excess caustic is neutralized, and the product purified by appropriate means.

Since the new hydroxyethyl methyl cellulose ethers are water-soluble but non-thermal gelling below 100° C., the byproducts are removed by washing with appropriate organic solvents or limited amounts of aqueous salt solutions. Particularly useful in minimizing the loss of the water-soluble product is the glyoxal insolubilization process described in U.S. Pats. 3,347,847 and 3,527,751. After purification, the product can be dried, granulated, ground, surface-treated, or otherwise prepared for storage and end use.

The new water-soluble hydroxyethyl methyl cellulose ethers exhibit many of the properties of other water-soluble methyl cellulose ethers. However, they have a thermal gel point higher than about 100° C. They are readily prepared in a wide range of viscosities. For use as a latex paint thickener, a 2% aqueous solution viscosity at 20° C. of about 400–100,000 cps. and preferably about 4,000–50,000 cps. is most useful. For other applications, products with viscosities lower than 400 cps. can be prepared as desired.

These cellulose ethers are particularly useful in aqueous latex coating compositions as thickeners and protective colloids for the dispersion of finely divided water-insoluble polymer particles. Examples of such polymeric materials are copolymers of monoethylenically unsaturated compounds such as styrene and acrylonitrile with a conjugated diolefin such as butadiene; homo- and copolymers of styrene, acrylic and methacrylic esters; vinyl halide and vinylidene halide monomers; and homopolymers and copolymers of vinyl acetate. They can also be used with a carboxylic polymer latex such as described in Mesirov U.S. Pat. 3,549,566.

Usually these latex coating compositions contain added pigment fillers and extenders such as titanium dioxide, barium sulfate, clays, mica, talc, silica, and the like. Particularly with colored pigments and dyes, the new hydroxyethyl methyl cellulose ethers provide superior color development as well as good film and application properties. Effective results are obtained using about 0.2–1.0 wt. percent HEMC, and preferably about 0.25–0.6 wt. percent HEMC, based on total weight of the formulated paint.

The following examples illustrate further the present invention. Unless indicated, all parts and percentages are by weight.

EXAMPLE 1

Preparation of HEMC (A) A pressure reactor was charged with 250 parts (1.55 moles) of ground cotton linters, evacuated and repressured with nitrogen several times. Then with internal agitation and blending, 356 parts (4.45 moles) of 50% aqueous NaOH was sprayed onto the linters to prepare alkali cellulose. The reactor was reevacuated, loaded with 400 parts (7.93 moles) of methyl chloride, and heated to about 44°–50° C. Then ethylene oxide was added at a rate so that 400 parts (5.87 moles) ethylene oxide were added in about 2.5–3.0 hours while maintaining a reaction temperature of about 44°–50° C. Cooling was provided by cooling jacket and reflux of the low boiling reactants and dimethyl ether. After complete addition of the ethylene oxide, the reaction mass was heated at about 50° C. for another half hour before cooling and venting the reactor.

To remove the water-soluble salts and byproducts, the crude solid product, about 1140 parts including about 380 parts HEMC, was blended with 85 parts of 50% aqueous citric acid to adjust the pH to about 5.0 followed by 24 parts of 40% aqueous glyoxal. The mixture was blended thoroughly and then heated at 70°–90° C. for 20–30 minutes to obtain a water-resistant, surface crosslinking of the HEMC. The crude product was cooled to room temperature, washed twice by slurrying with about 6 parts of cold water per part of product and filtering, and then dried at 80°–120° C.

The purified HEMC (375 parts) was a white powder with a gel point of 115° C. and a 2% aqueous solution viscosity of 35,300 cps. at 20° C. It had a hydroxyethyl MS of 1.73, a methoxyl DS of 0.95, and a total of 1.76.* It dispersed readily in water with gradual dissolution at an acid pH and rapid when basic. It had excellent salt compatibility, 100 parts of a 2% solution dissolving in separate tests 38 parts NaCl, 10 parts $NaHPO_4$, more than 50 parts sugar, 19 parts $Na_2CO_3$, and 11 parts $Al_2(SO_4)_3$ before salting out. Its organic solubility in aqueous alcohol and acetone was high. Also as shown below, its enzymatic resistance and compatibility in standard color development tests were both excellent.

(B) In another run 220 parts (1.23 moles) of ground cellulose pulp was treated with 184 parts (2.3 moles) of 50% NaOH and then reacted with 78 parts (1.54 moles) of methyl chloride at 50° C. for 2.5 hours. The unreacted methyl chloride was vented and 20 parts of dimethyl ether added. Then 360 parts (8.2 moles) of ethylene oxide was added over 2.5 hours while holding a reaction temperature of 42–45° C. When the exothermic reaction ceased, the reactor was cooled and vented. Then 80 pts. of 50% citric acid and 16 pts. of 40% glyoxal were sprayed onto the solid reaction product and the mixture heated at 80° for 3 hours.

The glyoxal-treated product was washed with cold water and dried to give a purified HEMC having a gel point of 123° C., a 2% aqueous solution viscosity of 15,600 cps. at 20° C., and a hydroxyethyl MS of 2.66, a methoxyl DS of 0.70 and a total DS of 1.54.

(C) A blender was charged with 175 parts (1.08 moles) of ground cellulose linters and sprayed with 240 parts (3.0 moles) of 50% NaOH in the absence of air to form alkali cellulose. The alkali cellulose was transferred to the etherification reactor and 280 parts (5.55 moles) of methyl chloride added. The reactor was heated to 42° C. and then 280 parts (6.35 moles) of ethylene oxide was added over 2.5 hours as the temperature was gradually raised to 48° C. Then the temperature was increased to 55° C. for 1.5 hours to complete the etherification.

The crude HEMC was purified as described in 1A and 1B to give a white solid with a gel point of 100° C., a 2% aqueous solution viscosity of 29,700 cps. at 20° C., and a hydroxyethyl MS of 1.74, a methoxyl DS of 1.12 and a total DS of 1.71. Its enzyme resistance and color compatibility were excellent.

(D) In a similar manner 175 parts (1.08 moles) of ground cellulose was treated with 260 parts (3.26 moles) of 50% NaOH and then reacted with 100 parts (1.98 moles) of methyl chloride at 45° C. The reactor was vented, 150 parts dimethyl ether added, and at 42° C. 310 parts (7.0 moles) of ethylene oxide was added over

---

* The analyses are by conventional methods as described in ASTM D–1346–64 and D–2363–69. The hydroxyethyl MS and methoxy DS were determined by the modified Zeisel method described by Cobler, Samsel & Beaver, Talanta, 9, 473 (1962) using hydriodic acid hydrolysis coupled with a gas phase chromatographic analysis of the resulting mixed alkyl iodides. The hydroxyethyl DS was determined by the modified phthalic anhydride-pyridine method described by Pascal, Comptes Rendus, 248, 225 (1959) and found to be specific for the terminal primary OH of the hydroxyethyl ether group. The total DS is then the sum of the methoxyl and hydroxyethyl DS. Gel points were determined using 1% aqueous solutions heated in a sealed ampoule until visual phase separation.

2 hours. When the exothermic reaction ceased, the reactor was vented and evacuated to remove the volatile reactants and byproducts. The residual NaOH was neutralized with citric acid and then aqueous glyoxal was added and reacted as above.

The purified HEMC had a gel point of 105° C., a 2% aqueous solution viscosity of 27,800 cps. at 20° C., and a hydroxyethyl MS of 1.61, a methoxyl DS of 0.88, and a total DS of 1.43.

(E) A 3 gallon stirred reactor was charged with 600 parts (3.71 moles) of ground cellulose pulp. Air was removed by evacuating and repressurizing with nitrogen twice. Then the stirred cellulose was sprayed with 680 parts of 50% NaOH (8.5 moles) added in about 20 minutes. Then 250 parts (4.95 moles) methyl chloride was added. The reactor was heated to 42° C. and held 1 hour and then at 65° C. for 45 minutes to achieve partial methylation. After cooling to about 35° C., 400 parts of dimethyl ether was added, the temperature adjusted to 40°-45° C. and 600 parts (13.7 moles) of ethylene oxide added in 50 part increments every 20 minutes while maintaining a reaction temperature of about 45°-50° C. The reactor was held at 55° C. for an hour after the ethylene oxide addition was completed before cooling and venting.

The crude HEMC was slurried with 90% acetone/10% $H_2O$, neutralized with glacial acetic acid, and then treated with 22 parts 40% aqueous glyoxal and 5.5 parts 50% aqueous citric acid per 1000 parts of crude HEMC. The slurry was heated to 50° C., filtered hot and the solid product dried in a forced air drier at 80°-120° C. The dried HEMC was further washed by slurrying with cold (10°-20° C.) water, followed by filtration and redrying. The product was a water-dispersible powder with a gel point higher than 160° C., a 2% aqueous solution viscosity of 2810 cps. at 20° C., and a hydroxyethyl MS of 1.37, a methoxyl DS of 0.53, and a total DS of 1.02. Its enzymatic resistance was poor.

(F) In another run, 600 parts (3.71 moles) of ground cellulose was sprayed at room temperature with 515 parts (4.50 moles) of 35% aqueous NaOH. The reactor was evacuated and 200 parts (3.96 moles) methyl chloride and 200 parts dimethyl ether added. The mixture was heated to 45° C. and 1016 parts (23.0 moles) ethylene oxide added over 3 hours while maintaining a reaction temperature of 45°-50° C. After holding at 50° C. for an hour after complete oxide addition, the reactor was cooled, vented, and dumped.

The crude product was slurried with aqueous acetone, treated with glyoxal at pH 3-5, and purified as described in Example 1E. The product was a water-dispersible powder with a gel point higher than 160° C., a 2% aqueous solution viscosity of 3500 cps. at 20° C., and a hydroxyethyl MS of 3.34, a methoxyl DS of 0.66, and a total DS of 1.92. It had good enzymatic resistance.

(G) Following the procedure of Example 1A, alkali cellulose prepared from 250 parts (1.55 moles) ground cellulose and 132.5 parts (3.30 moles) sodium hydroxide was thoroughly blended with 400 parts (7.95 moles) methyl chloride. The blended mixture was gradually heated to 56° C. Addition of 300 parts (6.8 moles) ethylene oxidew as begun when the temperature of the blended mass reached 45° C. and was completed in about 1.7 hours while maintaining a temperature of about 56° C. After holding at about 56° C. for an additional 0.5 hour, the etherification reaction was finished by heating the mass at about 65° C. for one hour.

The crude HEMC was purified by washing after glyoxal treatment to give a white solid with a gel point of 115° C., a 2% aqueous solution viscosity of 80,00 cps. at 20° C., a hydroxyethyl MS of 1.53, a methoxyl DS of 1.15 and a total DS of 1.74. Its enzyme resistance and color compatibility were excellent.

(H) In other runs, cellulose was etherified with methyl chloride and ethylene oxide using about 1.2-3.0 moles NaOH, 1.0-6.0 moles methyl chloride, and 3.4-6.8 moles ethylene oxide per mole of cellulose to obtain water-soluble HEMC products within the area defined by Points A-J in the accompanying figure.

A detailed study of the HEMC analyses established an analytical variance ($\pm 3\delta$) of $\pm 0.1$ for hydroxyethyl MS, $\pm 0.06$ for methoxyl DS, and $\pm 0.2$ for total DS. Also revised analyses were found for several HEMC products:

| HEMC | Initial | | | Revised | | |
|---|---|---|---|---|---|---|
|  | HE (MS) | MeO (DS) | Total DS | HE (MS) | MeO (DS) | Total DS |
| 1A | 1.73 | 0.95 | 1.76 | 2.12±0.23 | 1.14±0.06 | 1.95±0.21 |
| 1B | 2.66 | 0.70 | 1.54 | 2.91±0.09 | 0.80±0.04 | 1.83±0.16 |
| 1F | 3.34 | 0.66 | 1.92 | 3.32±0.05 | 0.61±0.01 | 1.87±0.21 |
| 1H-2 | 1.96 | 0.79 | 1.49 | 2.31±0.36 | 0.83±0.12 | 2.02±0.23 |

EXAMPLE 2

HEMC as latex paint thickener

The utility of the new HEMC products as thickeners for latex paint is illustrated by data obtained with standard latex paint formulations and tests.

(A) Formulations

Stock 3% aqueous solutions of the HEMC products were prepared and used as the thickener solution in the following typical exterior and interior latex paint formulations.

1.—Exterior Acrylate Latex Paint Base

| Ingredients | Lbs./100 gal. | Gallons |
|---|---|---|
| Water | 124.9 | 14.99 |
| Pigment dispersant (Daxad 30) | 8.0 | 0.96 |
| Potassium tripolyphosphate | 2.0 | 0.20 |
| Defoamer (Polyglycol P-1200) | 8.0 | 1.08 |
| Preservative (Dowicil 100) | 2.0 | 0.17 |
| Titanium dioxide, (Ti Pure R-901) | 200.0 | 6.06 |
| Calcium carbonate (Atomite) | 257.0 | 11.37 |
| Surfactant (Triton X-100) | 5.0 | 0.57 |
| Ethylene glycol | 15.0 | 1.64 |
| Acrylic latex (Rhoplex AC 34) | 387.0 | 43.50 |
| 3% Thickener solution | 167.0 | 20.00 |
| Total | 1,175.9 | 100.50 |

(2) INTERIOR POLYVINYL ACETATE LATEX PAINT BASE

Ingredients: Lbs./100 gal.
- Water _____ 300.0
- Pigment dispersant (Daxad 30) _____ 6.0
- Potassium tripolyphosphate _____ 0.5
- Surfactant (Igepal CO-630) _____ 4.0
- Preservative (Dowicil 100) _____ 1.25
- Ethylene glycol _____ 25.0
- Titanium dioxide (Ti-Pure R-901) _____ 250.0
- Calcium carbonate (Snowflake White) ___ 100.0
- Clay filler (ASP-400) _____ 125.0
- Coalescent (Texanol) _____ 16.0
- Polyvinyl Acetate Latex (Elvocit 1423) __ 250.0
- Defoamer (Nopco NDW) _____ 2.0
- 3% Thickener solution _____ 167.0

1246.8

(B) Tests (1) Thickening efficiency.—The paint viscosity was measured 24 hours after preparation. A viscosity of about 85-100 Kreb Units is normally desired with about 3-5 lbs. HEMC/100 gal. of paint, i.e., about 0.2-0.4 wt. percent HEMC based on formulated paint.

(2) Color development.—Paint samples are separately tinted with standard colorants at room temperature and at 120° F. (49° C.). The heated sample simulates tinting paint hot from a grinding step. Then 10 ml. draw-downs of the tinted paint samples are made on a "Penopac" chart and the wet paint film is then rubbed with a finger until the area is almost dry. After final drying, the color of the rubbed area is visually compared with the unrubbed area and rated against standards with a rating of 1 indicating a perfect color development and 10 a severe lack of color development.

(3) Flow and leveling.—"Brush outs" are prepared using 20 g. of latex paint applied to 2 ft.² surface. The effect of the thickener on flow and leveling is measured compared with standard "brush outs" with a rating of 1—best to 10—poorest.

(4) Enzyme stability.—To evaluate enzyme stability or resistance, paint samples are inoculated with a standard cellulose enzyme (Cellase 1000) and their viscosities are periodically measured. The rate and total loss of viscosity are measures of resistance to enzyme degradation.

(C) Results

Typical results using HEMC to thicken the base latex paint formulation 1 and 2 above are given in Table 1. For comparison data obtained concurrently with commercial hydroxypropyl methyl cellulose and hydroxyethyl cellulose thickeners are included. Note that the HEMC thickened paints have superior color development compared with the hydroxypropyl methyl cellulose and improved enzymatic stability compared with the hydroxyethyl cellulose. At the same time HEMC retains generally equivalent thickening efficiency and flow and leveling properties.

TABLE 1.—HEMC AS LATEX PAINT THICKENER

| Latex paint | Thickener [1,2] | Substitution | | | Gel point, ° | Visc., KU 24 hrs. | Color dev.[3] | | Flow and leveling | Enzyme stab.[4] visc. loss, 4 wks., percent |
| --- | --- | --- | --- | --- | --- | --- | --- | --- | --- | --- |
| | | HE(MS) | MeO(DS) | Total DS | | | RT | 120° F. | | |
| Formulation 1, Exterior Acrylate | HPMC | (1.0 HP) | 0.9 | | 70 | 93 | | 4 | 4 | 5 |
| | HEC | 2.50 | 0 | 1.00 | >100 | 98 | | 2 | | 25 |
| | HEMC-1A | 1.73 | 0.95 | 1.76 | 115 | 104 | 2 | 2 | 4 | 2 |
| | HEMC-1C | 1.74 | 1.12 | 1.77 | 100 | 103 | 2 | 2 | 4-5 | 6 |
| | HEMC-1F | 3.34 | 0.66 | 1.89 | >160 | 93 | 2 | 3 | 2-3 | 9 |
| | HEMC-1H-1 | 2.10 | 0.97 | 1.71 | | 104 | 2 | 2 | 4 | 10 |
| | HEMC-1D | 1.61 | 0.88 | 1.43 | 105 | 100 | 2 | 2 | 4-5 | 12 |
| Formulation 2, Interior PVAC | HPMC | (1.0 HP) | 0.9 | | 70 | 89 | | 2 | 4 | 0 |
| | HEMC-1B | 2.66 | 0.70 | 1.54 | 123 | 82 | | 2 | 4 | 5 |

[1] 5 lbs./100 gal; 0.43 wt. percent Formulation 1; 0.40 wt. percent Formulation 2.
[2] HPMC=Hydroxypropylmethyl cellulose (Methocel J 12 HS, The Dow Chemical Co.). HEC=Hydroxyethyl cellulose (Natrosol 250 HR, Hercules, Inc.).
[3] Blue "C" Colorant (Hercules, Inc.).
[4] 0.5 p.p.m. Cellase 1000 enzyme.

EXAMPLE 3

HEMC and color development

Further data on the effect of HEMC substitution on color development with several different commercial pigments in the exterior acrylic latex paint Formulation 1 are given in Table 2.

TABLE 2—COLOR DEVELOPMENT TEST, 120° F

| Thickener [1] | Substitution | | | Gel point, ° C | Visc, KU | Rating [2,3] | | | | |
| --- | --- | --- | --- | --- | --- | --- | --- | --- | --- | --- |
| | HE (MS) | MeO (DS) | Total DS | | | Blue "C" | Thalo Blue | C Black | Mon Red | Viol J |
| HPMC | (1.0 HP) | 0.9 | | 70 | 95 | 4 | 2 | 4 | 5 | 4 |
| HEC | 2.50 | 0 | 1.00 | >100 | 108 | 2 | 2 | 2 | 2 | 2 |
| HEMC-1A | 1.73 | 0.95 | 1.76 | 115 | 104 | 2 | 2 | 2 | 2 | 2 |
| HEMC-1B | 2.66 | 0.70 | 1.54 | 123 | 77 | 2 | 3 | 2 | 3 | 2 |
| HEMC-1C | 1.74 | 1.12 | 1.71 | 100 | 103 | 2 | 2 | 2 | 2 | 2 |
| HENC-1H-1 | 2.10 | 0.97 | 1.71 | >100 | 104 | 2 | 2 | 2 | 2 | 2 |

[1] 5 lbs /100 gal ; 0 43 wt. percent.
[2] Scale: 1=Excellent, 10=Very poor
[3] Pigments: Blue "C"=Super Imperse Blue C, Type X2688 (Hercules, Inc ) Thalo Blue=Pthalocyanine Blue (Color Corp of America) C Black=Carbon Black (Hilton Davis). Mon Red=Monastral Red (Du Pont). Viol J=Violet J Universal Colorant, Color Trend Series (California Ink Corp.).

EXAMPLE 4

HEMC and enzyme resistance

Further data on the effect of HEMC substitution on the enzyme resistance of the exterior acrylate paint of Formulation 1 are given in Table 3.

TABLE 3.—ENZYME RESISTANCE[1] OF HEMC THICKENED ACRYLATE LATEX PAINT

| Thickener [2,3] | Substitution | | | Gel point, deg. | Viscosity, KU | | | | | Visc. loss, 8 wks., percent |
| --- | --- | --- | --- | --- | --- | --- | --- | --- | --- | --- |
| | HE(MS) | MeO(DS) | Total DS | | Init. | 1 wk. | 2 wks. | 4 wks. | 8 wks. | |
| HPMC | (1.0 HP) | 0.9 | | 70 | 93 | 89 | 83 | 83 | 83 | 11 |
| HEC | 2.50 | 0 | 1.00 | >100 | 98 | 82 | 77 | 72 | 69 | 30 |
| HEMC-1A | 1.73 | 0.95 | 1.76 | 104 | 103 | 102 | 100 | 100 | 99 | 5 |
| HEMC-1C | 1.74 | 1.12 | 1.77 | 100 | 103 | 100 | 99 | 97 | 96 | 6 |
| HEMC-1H-1 | 2.10 | 0.97 | 1.71 | | 103 | 97 | 95 | 92 | | 9 |
| HEMC-1H-2 | 1.96 | 0.79 | 1.49 | >160 | 87 | 83 | 82 | 83 | 79 | 19 |
| HEMC-1F | 3.34 | 0.66 | 1.89 | >160 | 93 | 90 | 88 | 85 | 84 | 10 |
| HEMC-1D | 1.61 | 0.88 | 1.43 | 105 | 100 | 90 | 88 | 87 | 85 | 15 |
| HEMC-1B | 2.66 | 0.84 | 1.54 | 123 | 86 | 77 | 78 | 77 | 72 | 16 |

[1] 0.5 p.p.m. Cellase 1000 enzyme.
[2] 5 lbs./100 gal.; 0.43 wt. percent.
[3] HPMC=Hydroxypropylmethyl cellulose (Methocel J12HS) HEC=Hydroxyethyl cellulose (Natrosol 250HR).

EXAMPLE 5

Modified lindenfors enzymatic stability test

To provide a more rapid evaluation of the enzymatic stability of the HEMC products, a modified Lindenfors viscosity loss test was developed using a 1.0% aqueous solution of the cellulose ether and 10% cellulase enzyme based on cellulose ether a pH 7.0±0.2 and 25°. This test gives viscosity losses in 30 minutes or less that correlate with standard paint stability as described in Examples 2–4.

Apparatus and materials

Haake Rotovisco Meter (Gebroder Haake K.G., West Berlin, Germany) with SV-1 cup and bob for measuring viscosities of 400–70,000 cps. using a shear rate of 529 sec.$^{-1}$ at 582 r.p.m.

1.0% aqueous solution of the cellulose ether at pH 7.0±0.2.

1.0% aqueous solution of Cellase 1000 (cellulase enzyme, Wallerstein Co., Deerfield, Ill.).

Method

The cup of the Haake instrument is charged with 12 ml. of the 1% cellulose ether solution and assembled with the SV-1 viscosity bob in the thermostated jacket (25±1° C.). The drive is engaged at 582 r.p.m. and the initial 1% viscosity read (Scale 0–100 units; 400–70,000 cps.). The drive is disengaged, 1.2 ml. of the 1% Cellase 1000 solution added, and the drive re-engaged to measure the viscosity as a function of time. The viscosity loss is calculated based on the initial viscosity after adding the cellulase enzyme.

Results

Typical results are given in Table 4 and FIG. 2. Under the rapid hydrolysis conditions of the modified Lindenfors test, the cellulose ether viscosity loss is essentially complete in 30 minutes. The enzymatic stability measured by this test correlates well with the 4-8 week accelerated paint stability tests of Examples 2-4. The HEMC products with a viscosity loss of less than about 60% in 30 minutes in this test provide superior enzymatic stability when used as a latex paint thickener.

Table 4 also includes color development test data obtained as described in Example 2 using the exterior acrylate latex paint formulation and commercial black, red and violet pigments. The combination of improved enzymatic stability and pigment compatibility, as shown in the color development test, obtained with the HEMC products is a major advance. The new water-soluble, nongelling HEMC products are also useful in many other applications as thickeners, protective colloids, soluble films, etc.

2. The water-soluble cellulose ether of claim 1 where the methoxyl degree of substitution is about 0.8–1.4 and the total degree of substitution is about 1.6–2.1.

3. The water-soluble cellulose ether of claim 1 having a 2% aqueous solution viscosity of about 400–100,000 cps. at 20° C.

4. The water-soluble cellulose ether of claim 1 having a 2% aqueous solution viscosity of about 4,000–50,000 cps. at 20° C.

5. The water-soluble cellulose ether of claim 1 further characterized by a 30-minute viscosity loss of less than about 60% as determined by the modified Lindenfors enzymatic stability test using a 1.0% solution of the cellulose ether and 10% cellulase enzyme based on the cellulose ether at pH 7.0±0.2 and 25° C.

6. The water-soluble cellulose ether of claim 5 having a 2% aqueous solution viscosity of at least 4,000 cps. at 20° C.

7. A process for preparing a water-soluble hydroxyethylmethyl cellulose having a thermal gel point greater than about 100° C., comprising:
(A) preparing an alkali cellulose by contacting cellulose with about 1.2–3.0 moles of 35–70% aqueous NaOH per mole cellulose;
(B) blending the alkali cellulose with about 1.0–6.0 moles methyl chloride per mole cellulose and heating to about 40°–50° C.;
(c) adding about 3.4–6.8 moles of ethylene oxide per mole cellulose over about 2.5–4.0 hours while maintaining a temperature of about 40°–60° C.; and thereafter
(d) recovering a solid hydroxyethylmethyl cellulose having a hydroxyethyl molar substitution of about 1.0–3.5, a methoxyl degree of substitution of about 0.6–1.6, and a total degree of substitution of about 1.4–2.4 as further defined in FIG. 1.

8. The process of claim 7 where after the ethylene oxide addition, the reaction mixture is heated at about 55°–80° C. for about 0.2–3.0 hrs. before recovering the solid hydroxyethyl methyl cellulose.

TABLE 4.—MODIFIED LINDENFORS ENZYME STABILITY TEST

| Cellulose ether [1] | Substitution | | | Gel T, ° C. | 2% visc., cps. | Percent visc. loss [2] in— | | Color dev.,[3] 120° F. |
|---|---|---|---|---|---|---|---|---|
| | HE (MS) | MeO (DS) | Total DS | | | 2 min. | 30 min. | |
| HEC | 2.50 | 0 | 1.00 | >100 | 8,000 | 73 | [4] [78/10] | 2/2/2 |
| MC | 0 | 1.8 | 1.8 | 50 | 8,000 | 69 | [88/10] | 10/10/10 |
| HPMC-65HG | (0.15 HP) | 1.8 | 1.9 | 65 | 4,000 | 50 | 83 | 10/10/10 |
| HPMC-J12 | (1.0 HP) | 0.9 | | 70 | 12,000 | 23 | 56 | 10/10/10 |
| HPMC-J75 | (1.0 HP) | 0.9 | | 75 | 75,000 | 38 | 70 | 10/10/10 |
| HEMC-T | 0.13 | 1.69 | 1.82 | 80 | 6,000 | 55 | [4] [(69/10)] | 10/10/10 |
| HEMC-1A-1 | 2.12 | 1.14 | 1.95 | 115 | 6,000 | 13 | 46 | |
| HEMC-1G | 1.53 | 1.15 | 1.74 | 115 | 80,000 | 14 | 40 | 2/3/2 |
| HEMC-1H-4 | 1.09 | 1.27 | 1.81 | 105 | 84,000 | 15 | 47 | 3/3/3 |
| HEMC-1H-5 | 1.33 | 1.30 | 2.08 | 124 | 24,000 | 19 | 49 | 4/2/5 |
| HEMC-1H-6 | 1.49 | 1.35 | 2.10 | 110 | 95,000 | 13 | 38 | 4/2/5 |
| HEMC-1H-7 | 1.15 | 1.25 | 1.96 | 106 | 56,000 | 17 | 50 | 3/2/5 |
| HEMC-1H-8 | 1.27 | 1.29 | 1.90 | 104 | 38,000 | 5 | 24 | 4/3/5 |

[1] HEC=Hydroxyethyl cellulose (Natrosol 250 HR, Hercules). MC=Methyl cellulose (Methocel MC, The Dow Chemical Co.). HPMC=Hydroxypropymethyl cellulose (The Dow Chemical Co.). HEMF-T=Hydroxyethylmethyl cellulose (Tylose MH, Kalle AG).
[2] Modified Lindenfors enzyme stability test.
[3] Pigments, Aquablak (Cities Service)/Monastral Red (Du Pont)/Violet J (Pittsburgh Plate Glass).
[4] Percent loss in 10 minutes.

We claim:

1. A water-soluble hydroxyethylmethyl cellulose having a thermal gel point greater than about 100° C., a hydroxyethyl molar substitution of about 1.0–3.5, a methoxyl degree of substitution of about 0.6–1.6, and a total degree of substitution of about 1.4–2.4 as further defined by FIG. 1.

9. The process of claim 7 where the recovered cellulose ether has a 2% aqueous solution viscosity of about 400–100,000 cps. at 20° C.

10. The process of claim 7 where the recovered cellulose ether has a 30-minute viscosity loss of less than about 60% as determined by the modified Lindenfors enzymatic stability test using a 1.0% solution of the cellulose enzyme based on the cellulose ether at pH $7.0 \pm 0.2$ and 25° C.

References Cited

UNITED STATES PATENTS

| | | | |
|---|---|---|---|
| 2,131,733 | 10/1938 | Haskins et al. | 260—152 |
| 2,469,764 | 5/1949 | Erickson | 260—231 A |
| 2,839,419 | 6/1958 | Windover et al. | 260—231 A |
| 2,849,328 | 8/1958 | Swinehart et al. | 260—231 A |
| 2,949,452 | 8/1960 | Savage | 260—231 A |
| 3,347,847 | 10/1967 | Engelskirchen et al. | 260—232 |
| 3,388,082 | 6/1968 | Rodgers et al. | 260—17 |
| 3,453,261 | 7/1969 | Scherff | 260—231 A |
| 3,493,407 | 2/1970 | Greminger et al. | 106—170 |
| 3,527,751 | 9/1970 | Gill | 260—232 |
| 3,549,566 | 12/1970 | Mesirov | 260—8 |

OTHER REFERENCES

Lindenfors: Acta Chemica Scand., 16, pp. 1111–1118, (1962).

Encyclopedia of Chemical Technology, vol. 3, pp. 496–7 and 510 (1965).

DONALD F. CZAJA, Primary Examiner

R. W. GRIFFIN, Assistant Examiner

U.S. Cl. X.R.

106—170, 197 R; 117—166; 260—17 R, 33.2 R